Aug. 21, 1951  W. F. STEUCK  2,565,276
CLEANING DEVICE FOR DUAL STEERING WHEELS OF TRACTORS
Filed April 8, 1949
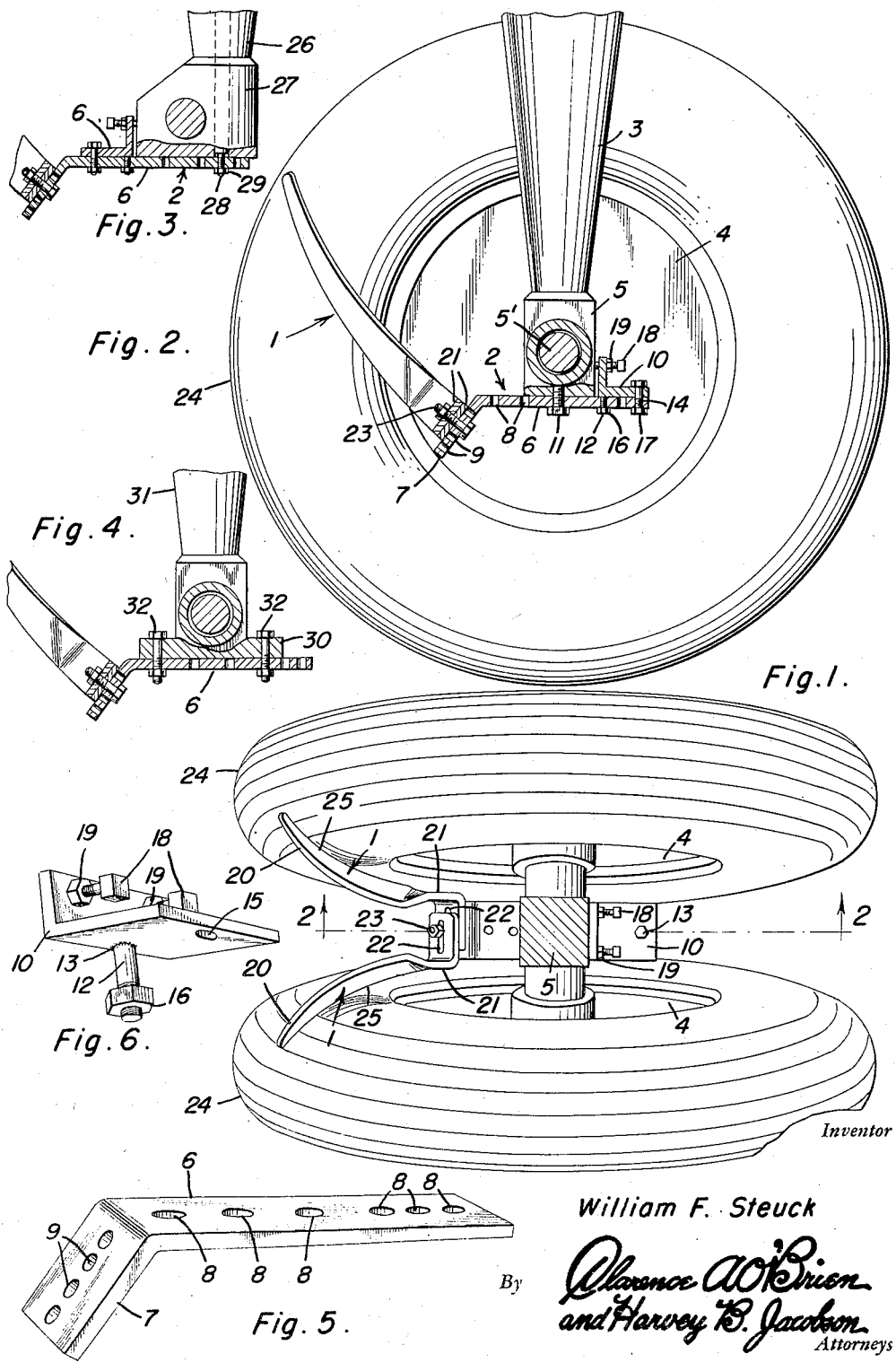
Inventor
William F. Steuck Patented Aug. 21, 1951

2,565,276

UNITED STATES PATENT OFFICE 2,565,276

CLEANING DEVICE FOR DUAL STEERING WHEELS OF TRACTORS

William F. Steuck, Primghar, Iowa

Application April 8, 1949, Serial No. 86,306

1 Claim. (Cl. 280—158)

My invention relates to improvements in cleaning devices of the scraper type for the pneumatic tires of dual steering wheels of row crop tractors, especially, although not necessarily.

By way of premise, the dual steering wheels of such tractors usually converge downwardly into close proximity at the ground and because of that arrangement such wheels tend, in muddy and trashy soil, to pick up and accumulate trash and soil on the inboard sides of the tires thereof which collects behind the steering post of the wheels between the tires and the tractor frame and interferes with operation of the tractor.

Having the foregoing in mind, it is the primary object of my invention to provide cleaning devices of simple form and inexpensive construction especially designed for mounting between such dual wheels to remove with a scraping action the soil and trash from the inboard sides of the tires, in a manner to effectively prevent accumulation of trash and soil on the tires behind the steering post.

Another object is to provide cleaning devices of the type and for the purpose above indicated which are especially adapted for use with tires of different sizes and for attachment to different types of steering posts of such tractors.

Still another object is to provide scraper blades shaped and mounted on the steering post of such steering wheels at an angle to scrape trash and soil outwardly, tangentially and rearwardly of the tires in a manner rendering the blades more effective than similar devices and with less braking resistance to travel of the wheels forwardly, and less strain on the scraper blades.

Other and subordinate objects, within the purview of my invention, together with the precise nature of my improvements will be readily understood when the succeeding description and claim are read with reference to the drawings, accompanying and forming part of the specification.

In said drawings:

Figure 1 is a view in plan, partly in section, illustrating my improved cleaning devices in a preferred embodiment thereof mounted on one type of steering post for the dual steering wheels of a row crop tractor;

Figure 2 is a view in vertical section taken on the regular line 2—2 of Figure 1;

Figure 3 is a fragmentary view in side elevation, partly in vertical section, illustrating the cleaning devices mounted on another type of steering post;

Figure 4 is a similar view illustrating a modification of the mounting;

Figure 5 is a view in perspective of the bracket bar of the mounting;

Figure 6 is a view in perspective of the stabilizing angle plate for the bracket bar.

Referring now to the drawings by numeral, and first to Figures 1, 2, 5 and 6, my improved cleaning devices, comprise a pair of scraper members 1 and a mounting 2 for attaching the scraper members 1 to the bottom of the steering post 3 for the dual steering wheels 4 of the tractor, not shown. In the preferred embodiment of the invention illustrated in Figures 1, 2, 5 and 6, the mounting 2 is especially designed for attachment to a rectangular bottom boss 5 on the steering post 3 through which the wheel axle 5' extends. The scraper members 1 will presently be described in detail.

The mounting 2 comprises a bracket bar 6 with a downwardly and rearwardly inclined rear end 7, longitudinally spaced bolt holes 8 in said bar 6 for attaching the same to the steering post 3, longitudinally spaced bolt holes 9 in the rear end 7 of the bracket bar 6 for attaching the scraper members 1 to said end, and a stabilizing angle plate 10 for said bar 6.

The bracket bar 6 is attached flat to the bottom of the boss 5 in horizontally extending position with the rear end 7 thereof suitably spaced in the rear of the boss 5, by means of a stud bolt 11 inserted into a selected bolt hole 8, selected in accordance with the desired endwise adjustment of said bracket bar 6 on the steering post 3.

The stabilizing angle plate 10 is secured on top of the bracket bar 6 by a stud bolt 12 welded to said plate 10, as at 13, and by a second bolt 14 extending through a bolt hole 15 in said plate 10, the bolts 12, 13 being passed through selected bolt holes 8 in the bracket bar 6 to position said plate 10 close to the front side of the boss 5. Nuts 16, 17 are provided on the bolts 12, 13. A pair of set bolts 18 are provided in the stabilizing angle plate 10 with lock nuts 19 thereon, and for turning against the front face of the boss 5 upon opposite sides of the longitudinal center of the bracket bar 6, whereby said bar may be pivotally adjusted on the stud bolt 11 and stabilized in edgewise adjusted position for a purpose presently seen.

The scraper members 1 comprise, respectively, a scraper blade 20 tapering edgewise from a right angle shaped shank 21 provided with a slot 22 transverse to the blade 20. The scraper members 1 are attached by the shanks 21 to the rear end 7 of the bracket bar 6 to extend upwardly and rearwardly between the wheel tires 24 in slightly spaced relation thereto with the scraper blades 20 opposed and the shanks 21 overlapping. A single nut equipped bolt 23 extending through the slots 22 and through a selected bolt hole 9 attaches said members 1 to said end 7. The scraper blades 20 are twisted laterally uniformly throughout the length thereof from the shanks 21 to present lower scraper edges 25 to the tires 24 and are curved longitudinally to flare, relatively, from the shanks 22 and thereby adapt the end portions thereof to conform substantially with the contour of the tires 24 from the junctures of the treads with the side walls of said tires.

A particular feature of my invention is the upward angle of incidence of the scraper blades 20, longitudinally relative to the tires 24. As best shown in Figure 2, the scraper blades 20 extend upwardly and rearwardly alongside the tires 24 at an angle of at least 50 degrees to the horizontal, and not more than 60 degrees. This angle, together with the length of the scraper blades 20 provides for said blades extending tangentially across the tires 24, at the inboard sides thereof, so that the trash and soil picked up by the tires is scraped off the inboard sides of the same before it is carried to the steering post 3, with a minimum of braking effect against the forward travel of the wheels 4, the scraped off trash and soil tending to travel along said blades 20 toward the outer ends thereof and to fall off said blades below the same.

As will be seen, by adjusting the bracket bar 6 endwise, the scraper members 1 may be adjusted longitudinally for proper working relation alongside tires of different sizes. By selection of bolt holes 9, the shanks 21 may be adjusted, upwardly, or downwardly, obliquely along the rear end 7 of the bracket bar 6 to adjust the scraper members 1 outwardly or inwardly of the tires 24, as occasion may require, without changing the angle of incidence of the scraper blades 20. By loosening the bolt 23, the shanks 22 may be pivoted on said bolt to variably incline the scraper blades 20 transversely relative to the tires 24 and to space said blades apart variably when the scraper members 1 are adjusted outwardly or inwardly of the tires 24, whereby to maintain the scraper blades 20 spaced from tires 24 of different sizes and working at the proper angle transversely relative to said tires.

In Figure 3, the mounting 2 has been shown as applied to a type of steering post 26 with a rearwardly extending bottom boss 27 and a vertical pivot rod 28 in the steering post 26. With this type of steering post 26, the rod 28 is used, with a nut 29 thereon in lieu of the bolt 11 of the first described embodiment of the invention. Otherwise, the arrangement is the same except that the angle plate 6 is used in the rear of the steering post 26.

In Figure 4 the bracket bar 6 has been shown as applied to the bottom flange 30 extending forwardly and rearwardly of another type of steering post 31, said bar 6 being bolted, as at 32, to said flange through selected bolt holes 8 in said bar. The angle plate 10 of the mounting 2 may be dispensed with when the invention is attached to this type of steering post 31.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention, what is claimed as new is:

A cleaning device for the tires of opposed dual wheels mounted upon opposite sides of a post comprising a pair of longitudinally curved scraper blades, a mounting for said blades attached to the bottom of said post and including a vertically oblique portion in the rear of said post, and means for attaching said blades to said portion between said wheels in spaced apart opposite relation, said blades when attached inclining upwardly and rearwardly in longitudinally flaring relation across the facing sides of said tires tangentially thereof, said means including lateral shanks on said blades adjustable vertically along said oblique portion for positioning said blades relative to tires of different sizes while maintaining the angle of inclination of said blades constant, said shanks being adjustable laterally on said portion and rotatable thereon to vary the space between said blades and the position thereof relative to said tires.

WILLIAM F. STEUCK.

REFERENCES CITED

The following references are of record in the file of this patent:

UNITED STATES PATENTS

| Number | Name | Date |
| --- | --- | --- |
| 1,108,833 | Crues | Aug. 25, 1914 |
| 2,157,253 | Yetter | May 9, 1939 |